Figure 1:
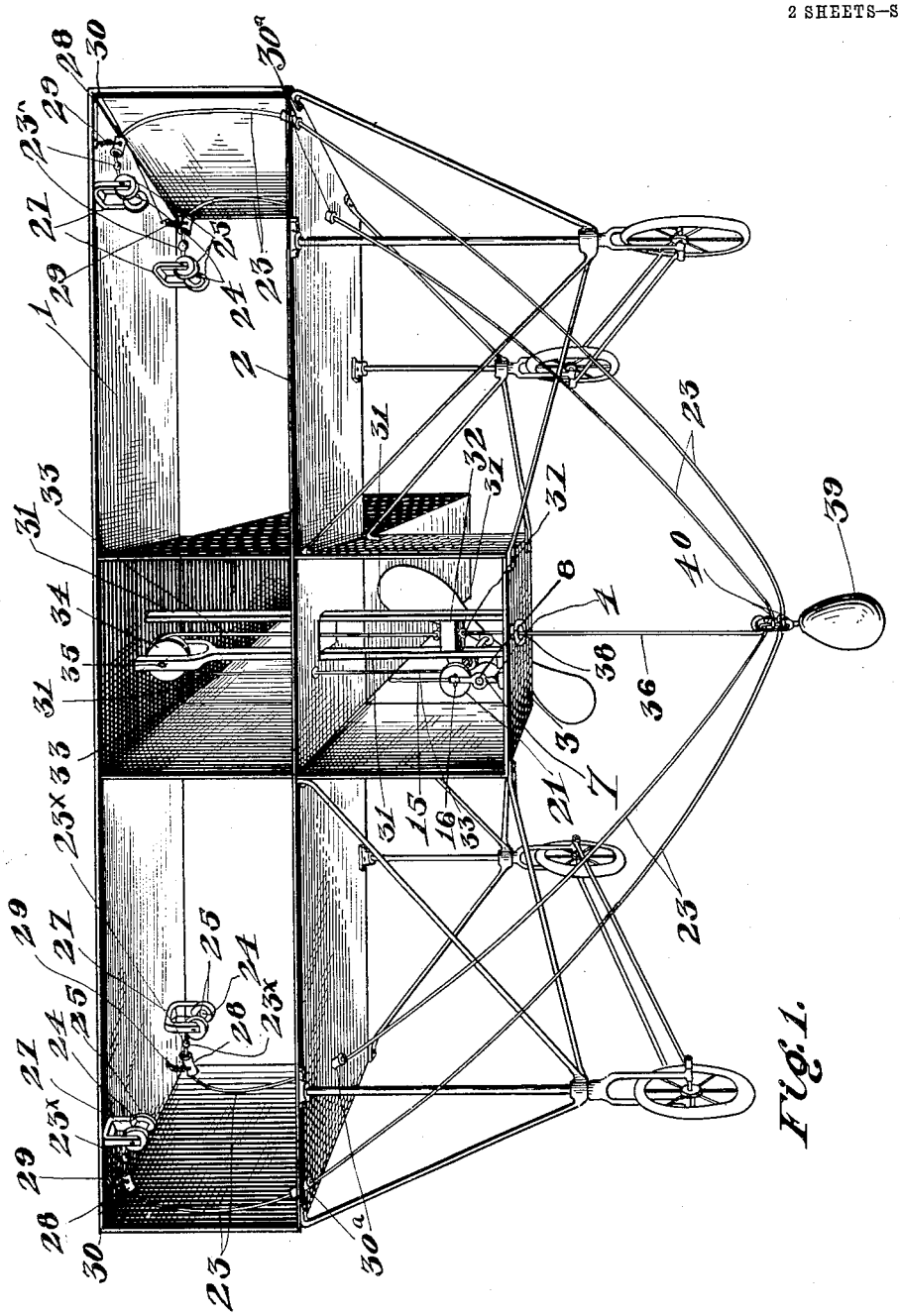

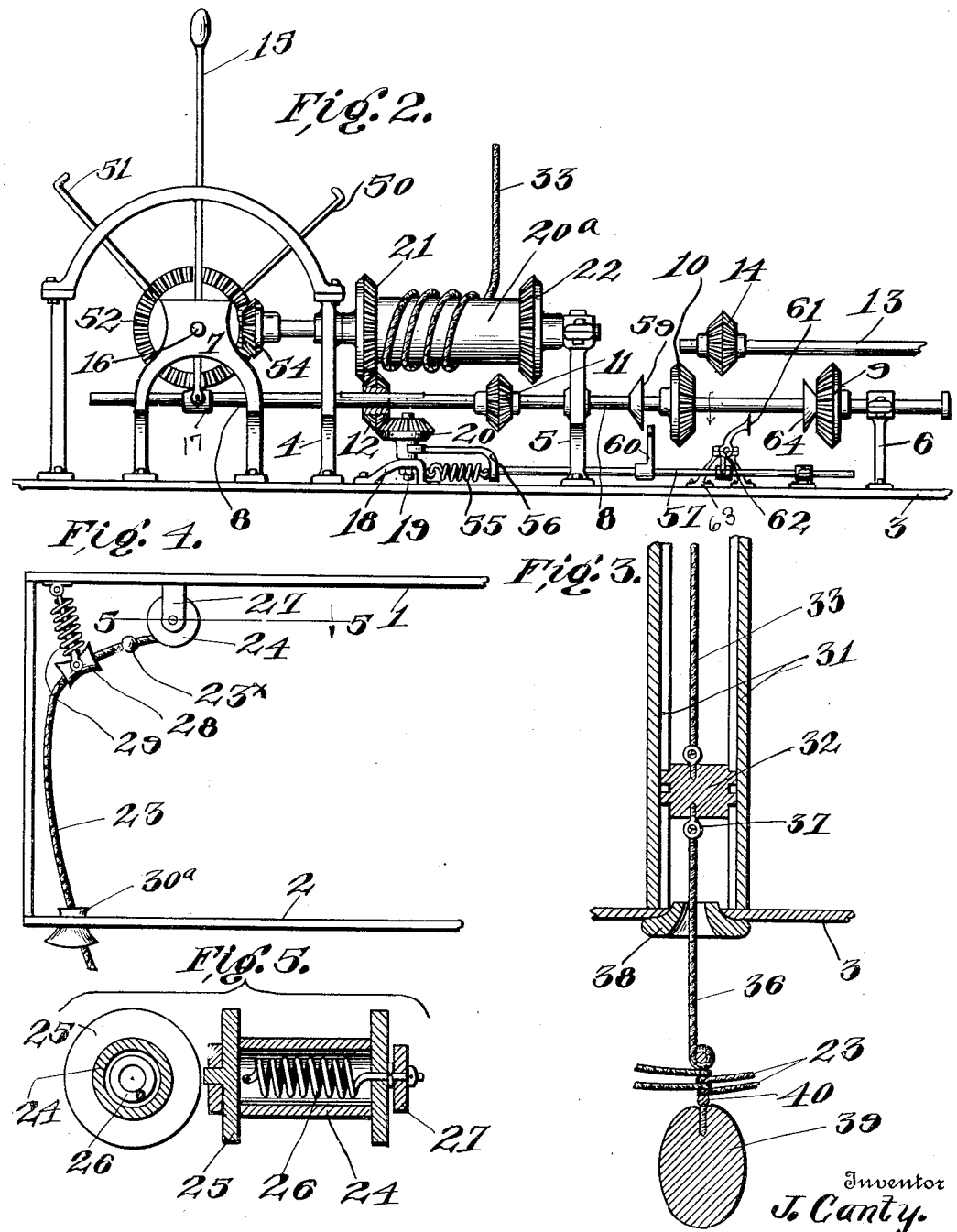

UNITED STATES PATENT OFFICE.

JOSEPH CANTY, OF CONCORD, NEW HAMPSHIRE.

BALANCING MECHANISM FOR AEROPLANES.

1,042,082.  Specification of Letters Patent.  Patented Oct. 22, 1912.

Application filed May 20, 1912. Serial No. 698,530.

*To all whom it may concern:*

Be it known that I, JOSEPH CANTY, a citizen of the United States, residing at Concord, in the county of Merrimack and State of New Hampshire, have invented certain new and useful Improvements in Balancing Mechanism for Aeroplanes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in balancing mechanism for aeroplanes and comprises a simple and efficient device of this nature having various details of construction and combinations and arrangements of parts which will be hereinafter fully described, shown in the accompanying drawings and then specifically defined in the appended claims.

I illustrate my invention in the accompanying drawings, in which:—

Figure 1 is a perspective view of a biplane having my improved balancing apparatus applied thereto. Fig. 2 is a detail view in elevation showing gear shifting mechanism. Fig. 3 is a detail sectional view through a part of the invention. Fig. 4 is an enlarged detail in elevation, and Fig. 5 is a sectional view through a detail forming a part of the invention.

Reference now being had to the details of the drawings by numeral, 1 and 2 designate respectively the upper and lower planes of the apparatus, and 3 designates a platform supporting the shifting mechanism illustrated in Fig. 2 and consisting of the standards 4, 5 and 6, said standards supporting the horizontally disposed shaft 8 to which are keyed beveled gear wheels 9, 10, 11 and 12, the latter being splined upon the shaft. A driving shaft 13 has a double beveled pinion 14 fixed thereto and adapted to mesh with one or another of the beveled wheels 9 and 10 accordingly as the shaft 9 is at its limit in one direction or the other.

An operating handle 15 is pivotally mounted upon a pin 16 upon the standard 7 and has swiveled connection at 17 (see Fig. 2) with the shaft 8 and affords means for imparting a longitudinal movement to the shaft 8. Mounted in suitable bearings in the standards 18 is a vertically disposed shaft 19 having a beveled gear wheel 20 secured thereto and which is in mesh with the splined wheel 12 which, it will be noted, is a double bevel gear. A reel or drum 20ᵃ has spindle ends journaled in the standards 4 and 5 and has two beveled gear wheels 21 and 22 fixed thereto, one near each end, the former adapted to mesh with the pinion wheel 12 and the latter with the pinion wheel 11, which latter, it will be noted, is also a double bevel wheel and, when in one adjustment with the shaft 8, is adapted to mesh with the teeth of the bevel pinion 20.

Arms 50 and 51 are fastened to the gear wheel 52 which is mounted upon the shaft 16, said wheel 52 being in mesh with the pinion 54 upon the reel carrying shaft. Said arms, as the pinion 52 is rotated a sufficient distance in one direction, are adapted to contact with a lever 15 to cause the same to actuate the shaft 8 longitudinally. For instance, assuming that the cable winding about the reel is adapted to be moved eight feet, when it unreels that distance, the pinion 54 will have caused the pinion wheel 52 to have rotated sufficiently to bring the arm 50 in contact with the lever, thus automatically throwing the gears 12 and 21 out of mesh with each other.

A spring 55 is fastened at one end to the bracket arm 18 and its other end to the yoke 56 which is secured to the longitudinally movable shaft 57. The forked end of the yoke 56 is adapted to be held by the tension of the spring 55 frictionally against the hub of the pinion wheel 20 to prevent the reel from turning when not in action, said yoke 3 being drawn from contact with the hub of the pinion 20 as the member 59 comes in contact with the finger 60 fixed to the shaft 57. The member 61, which is pivotally mounted upon a pin 62 upon the standard 63, has pivoted connection with the shaft 57. The said member 61 is in the path of the disk 64 upon the shaft 8 and is adapted, as the shaft 8 is moved longitudinally in one direction, to cause a longitudinal movement to be imparted to the opposite direction to the shaft 57.

Referring to Fig. 1 of the drawings, cables, designated by numeral 23, are adapted at their upper ends to wind about the spring-actuated reels 24, a detail sectional view of one of which is illustrated in Fig. 5 of the drawings and which, it will be noted, is hollow and provided with flanges 25 and a coiled spring 26 is mounted within each reel, one end of the spring being fastened to the reel and the other to the bracket member 27. The cables 23 pass about said reels 24 and also through the cylindrical bearing members 28, each of which is pivotally connected to a spring 29, the upper end of the spring being fastened at 30 to the upper plane 1. Fastened to each cable 23 is a ball 23ˣ, shown clearly in Fig. 4 of the drawings and which, as it comes in contact with the bearing member 28, prevents a further movement of the cable through said bearing member and causes any further pull upon the cable to be exerted upon the coiled spring 29. By this device, slack in the cable below the bearing members 28 will be prevented. It will be noted that said bearing members 28 are pivoted near their center and adapted to tilt and their ends are flaring for the purpose of reducing to a minimum the friction between the movable cables 23 and said bearing members. Similar bearing members, designated by numeral 30ª, are mounted in the lower plane and through these the cables pass.

Mounted centrally within the frame of the apparatus are the upright guide members 31 which are spaced apart and between which a cross head 32 has a vertical play and to which latter a cable 33 is secured and which passes about a pulley 34 and thence to the drum 20ª about which it winds. The spindles 35 of said pulley are journaled in the forked portion of one of the guide members 31.

A cable 36 is fastened to an eye bolt 37 secured to the cross head 32 and passes through a flanged tongue 38 held within an aperture in the platform 3 and its lower end is fastened to the weight 39 which has an eye 40 fixed thereto and to which the cable 36 is secured. The two cables 23, it will be noted, pass through said eye 40 and serve to guide the weight as it swings as a pendulum.

The operation of my invention will be readily understood and is as follows:—By the provision of the swinging weight, the planes of the apparatus will be balanced and, through the geared mechanism, when the operator causes the shaft 8 to be thrown to the right from the position shown in Fig. 2 of the drawings, the beveled pinion 10 will be thrown into mesh with the driving pinion 14, causing the shaft 8 to rotate in the direction of the arrow and, through the gear connection between the shaft 8 and reel 20ª, the latter will be moved in a clockwise direction, causing the cable to wind thereon and hoist the weight 39. As the weight 39 is raised, the coiled springs 26 within the drums 24 will cause the latter to wind up slack in the cables 23, keeping the same at all times taut. A reverse movement to the lever 15, causing the shaft 8 to move in the opposite direction, will throw the pinion 11 out of mesh with the pinion 22 and into mesh with the wheel 20, thus causing a reverse movement to the drum 20ª, allowing the weight to be lowered again.

It will be noted that, by the provision of the apparatus shown and described, the weight is allowed to have a lateral swinging movement, being guided by the cables which at all times are held taut, whether the weight is in a raised or lowered position.

Upon referring to Fig. 2, it will be noted that, when the reel upon which the cable winds revolves, a rotary motion will be imparted to the pinion wheel 52, causing the arm 51 to contact with the lever 15 and tilt the same which, in turn, will impart a longitudinal movement to the shaft 8. A reverse movement to the wheel will cause the second arm 50 to contact with the lever 15 and return the same to its starting position. By the provision of the yoke upon the shaft 57, the spring 55 will tend to hold the wheel at rest, the shaft 57 being moved longitudinally in two directions through the medium of the disks 59 contacting with the finger 60 and the disk 64 causing the member 61 to tilt.

What I claim to be new is:—

1. A balancing device for aeroplanes comprising, in combination with the planes of the apparatus, spring-actuated reels mounted upon one of the planes, cables winding about said reels, hollow spring-pressed bearing members mounted upon one of the planes and through which said cables are guided, a weight, a rope fastened thereto, means for raising and lowering the latter, said cables adapted to guide the weight as it swings as a pendulum, as set forth.

2. A balancing device for aeroplanes comprising, in combination with the planes of the apparatus, spring-actuated reels mounted upon one of the planes, cables winding about said reels, hollow spring-pressed bearing members mounted upon one of the planes and through which said cables are guided, a stop fixed to each cable and adapted to bear against the bearing member to limit the movement of the cable in one direction, a weight, an eye fixed thereto through which said cables pass, a rope secured to said eye, and means for raising and lowering said rope, as set forth.

3. A balancing device for aeroplanes comprising, in combination with the planes of the apparatus, spring-actuated reels mounted upon one of the planes, cables winding about said reels, hollow spring-pressed bearing members mounted upon one of the planes and through which said cables are guided, a stop fixed to each cable and adapted to bear against the bearing member to limit the movement of the cable in one direction, a weight, an eye fixed thereto through which said cables pass, guide members mounted upon the frame of the apparatus and spaced apart, a cross head movable between said guide members, a rope fastened to said cross head and to said weight, a winding drum, a cable fixed to said cross head and winding about said drum, a longitudinally movable shaft, gear wheels fixed thereto, means for driving the shaft, and lever-operated mechanism for shifting the driving shaft to cause the drum to rotate in one direction or the other, as set forth.

4. A balancing device for aeroplanes comprising, in combination with the planes of the apparatus, a pulley, a cable passing about the same, a weight secured to the cable, a rotatable shaft, a reel fixed thereon and about which the cable winds, a second and longitudinally movable shaft, a lever pivoted to said latter and adapted to move the same longitudinally, intermeshing pinion wheels, one being carried by the spindle of the reel, and arms upon the other pinion wheel adapted to contact with said lever to cause the same to tilt, and automatic means for moving the shaft to which said lever is pivoted longitudinally, as set forth.

5. A balancing device for aeroplanes comprising, in combination with the planes of the apparatus, a pulley, a cable passing about the same, a weight secured to the cable, a rotatable shaft, a reel fixed thereon and about which the cable winds, a second and longitudinally movable shaft, a lever pivoted to said latter and adapted to move the same longitudinally, intermeshing pinion wheels, one being carried by the spindle of the reel, arms upon the other pinion wheel adapted to contact with said lever to cause the same to tilt, a pinion wheel upon said longitudinally movable shaft and meshing with the pinion wheel upon the reel spindle, a horizontally rotating pinion wheel in mesh with said pinion upon the longitudinally movable shaft, and a yoke held yieldingly against said pinion wheel which rotates in a horizontal plane, as set forth.

6. A balancing device for aeroplanes comprising, in combination with the planes of the apparatus, a pulley, a cable passing about the same, a weight secured to the cable, a rotatable shaft, a reel fixed thereon and about which the cable winds, a second and longitudinally movable shaft, a lever pivoted to said latter and adapted to move the same longitudinally, intermeshing pinion wheels, one being carried by the spindle of the reel, arms upon the other pinion wheel adapted to contact with said lever to cause the same to tilt, a pinion wheel upon said longitudinally movable shaft and meshing with the pinion wheel upon the reel spindle, a horizontally rotating pinion wheel in mesh with said pinion upon the longitudinally movable shaft, a yoke held yieldingly against said pinion wheel which rotates in a horizontal plane, and means for retracting said yoke, as set forth.

In testimony whereof I hereunto affix my signature in the presence of two witnesses.

JOSEPH CANTY.

Witnesses:
F. W. GREEN,
ALBERT J. DEXTER.

---

Copies of this patent may be obtained for five cents each, by addressing the "Commissioner of Patents, Washington, D. C."